(12) United States Patent
Kawamoto et al.

(10) Patent No.: US 7,235,511 B2
(45) Date of Patent: Jun. 26, 2007

(54) EXHAUST GAS PURIFYING CATALYST

(75) Inventors: Tomohiko Kawamoto, Yokohama (JP);
Katsuyuki Fujita, Yokohama (JP);
Tadashi Tokuyama, Yokohama (JP);
Masahiko Shigetsu, Hiroshima (JP);
Masaaki Akamine, Hiroshima (JP);
Hisaya Kawabata, Hiroshima (JP);
Hideharu Iwakuni, Hiroshima (JP);
Akihide Takami, Hiroshima (JP)

(73) Assignees: Tokyo Roki Co., Ltd., Kanagawa (JP);
Mazda Motor Corporation, Hiroshima (JP)

( * ) Notice: Subject to any disclaimer, the term of this patent is extended or adjusted under 35 U.S.C. 154(b) by 236 days.

(21) Appl. No.: 10/933,808

(22) Filed: Sep. 3, 2004

(65) Prior Publication Data
US 2005/0070428 A1 Mar. 31, 2005

(30) Foreign Application Priority Data
Sep. 30, 2003 (JP) ............................. 2003-339088

(51) Int. Cl.
*B01J 23/00* (2006.01)
*B01J 21/00* (2006.01)
*B01J 20/00* (2006.01)

(52) U.S. Cl. ...................... 502/327; 502/326; 502/332; 502/333; 502/334; 502/339; 502/349; 502/355; 502/439; 502/415; 502/302; 502/304; 502/527.13

(58) Field of Classification Search ................ 502/326, 502/327, 332–334, 339, 349, 355, 439, 415, 502/302, 304, 527.13
See application file for complete search history.

(56) References Cited

U.S. PATENT DOCUMENTS

| 4,868,148 | A | * | 9/1989 | Henk et al. ................. 502/303 |
| 4,904,633 | A | | 2/1990 | Ohata et al. |
| 4,923,842 | A | * | 5/1990 | Summers ..................... 502/261 |
| 5,039,647 | A | | 8/1991 | Ihara et al. |
| 5,597,771 | A | * | 1/1997 | Hu et al. ..................... 502/304 |
| 5,948,723 | A | * | 9/1999 | Sung ........................... 502/303 |
| 5,981,427 | A | * | 11/1999 | Sung et al. .................. 502/325 |
| 6,107,240 | A | * | 8/2000 | Wu et al. ..................... 502/304 |
| 6,248,688 | B1 | * | 6/2001 | Wu et al. ..................... 502/302 |
| 6,294,140 | B1 | * | 9/2001 | Mussmann et al. ....... 423/213.5 |
| 6,514,905 | B1 | * | 2/2003 | Hanaki et al. .............. 502/328 |
| 6,764,665 | B2 | * | 7/2004 | Deeba et al. .............. 423/239.1 |
| 6,893,998 | B2 | * | 5/2005 | Shigapov et al. ........... 502/327 |
| 6,921,738 | B2 | * | 7/2005 | Hwang et al. ............... 502/240 |
| 2001/0036432 | A1 | * | 11/2001 | Hu et al. .................. 423/213.5 |
| 2002/0032123 | A1 | * | 3/2002 | Shigapov et al. ........... 502/304 |
| 2003/0147796 | A1 | * | 8/2003 | Suga et al. ............... 423/239.1 |
| 2004/0087439 | A1 | * | 5/2004 | Hwang et al. ............... 502/302 |

FOREIGN PATENT DOCUMENTS

| EP | 0 272 136 A2 | 12/1987 |
| EP | 0 558 159 A2 | 12/1987 |
| EP | 1 172 139 A1 | 7/2000 |
| EP | 1 136 115 A1 | 3/2001 |
| EP | 1 174 174 A1 | 7/2001 |
| JP | 5-47263 | 7/1993 |
| JP | 11-138011 | 5/1999 |
| JP | 2000140639 | 5/2000 |
| JP | 2003170047 | 6/2003 |

* cited by examiner

*Primary Examiner*—Cam N. Nguyen
(74) *Attorney, Agent, or Firm*—Brooks Kushman P.C.

(57) ABSTRACT

An exhaust gas purifying catalyst includes a carrier and a catalyst layer provided on the carrier. The catalyst layer includes active $Al_2O_3$ on which a noble metal is carried, an oxygen storage agent on which Rh is carried, $Al_2O_3$ coated with $ZrO_2$ on which Rh is carried, and a binder material.

5 Claims, 8 Drawing Sheets

(Pt / Al$_2$O$_3$) +
(Rh / CeO$_2$-ZrO$_2$-Nd$_2$O$_3$) +
(Rh / ZrO$_2$-coated Al$_2$O$_3$)

(Pd / Al$_2$O$_3$) +
(CeO$_2$) + (CeO$_2$-ZrO$_2$-Nd$_2$O$_3$)

Simulated gas

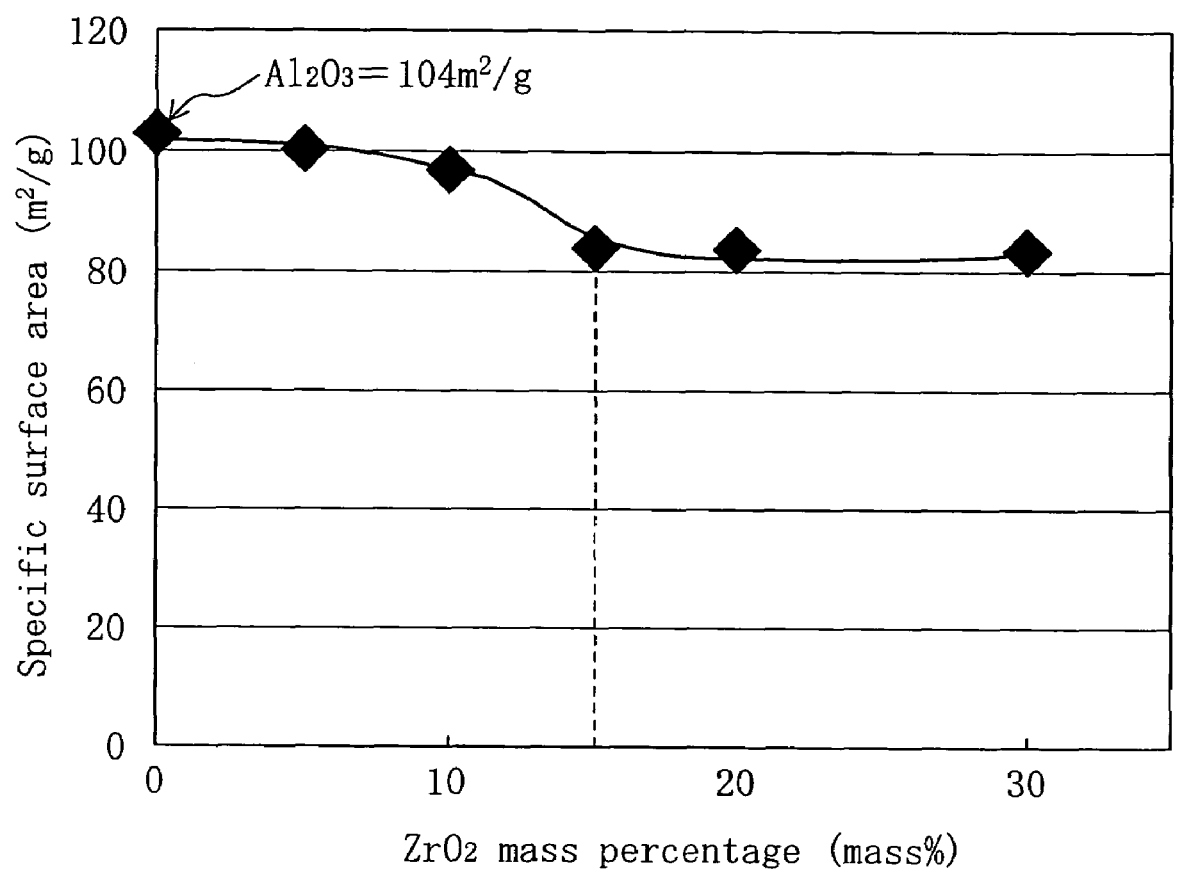

EXHAUST GAS PURIFYING CATALYST

CROSS REFERENCE TO RELATED APPLICATIONS

This nonprovisional application claims priority under 35 U.S.C. § 119(a) on Patent Application No. 2003-339088 filed in Japan on Sep. 30, 2003, the entire contents of which are hereby incorporated by reference.

BACKGROUND OF THE INVENTION

The present invention relates to an exhaust gas purifying catalyst.

As a catalyst metal included in an exhaust gas purifying catalyst for cars, a noble metal of Rh is widely used because of its high performance for reduction purifying NOx included in exhaust gas.

Japanese Laid-Open Patent Publication No. 11-138001 discloses an exhaust gas purifying catalyst in which Pt and Rh are both carried on a particulate zirconium-based composite oxide and a heat-resistant supporting carrier is coated with the zirconium-based composite oxide together with at least an oxygen storage rare earth oxide. This publication describes that since both Pt and Rh are carried on the zirconium-based composite oxide in this exhaust gas purifying catalyst, high catalytic activity can be expected even under severe high temperature circumstances.

Japanese Patent Publication No. 5-47263 discloses an exhaust gas purifying catalyst composed of a honeycomb carrier coated with a catalyst composition including platinum group metal carrying zirconia in which a platinum group metal including Rh is carried on zirconia powder and further including a refractory inorganic oxide and a rare earth oxide. This publication describes that the catalyst in which the platinum group metal is carried on the fine zirconia particles exhibits high initial performance and has high durability even under severe endurance conditions like a high temperature oxidizing atmosphere.

In an exhaust gas purifying catalyst, in order to attain a large contact area with exhaust gas for achieving high purifying performance, a material for carrying a catalyst metal is generally one having a large specific surface area, which is typically $Al_2O_3$.

In the case where Rh is carried on $Al_2O_3$ as the catalyst metal, however, solid solution of the Rh into the $Al_2O_3$ is proceeded through repeated uses at a high temperature over a long period of time, resulting in lowering the catalytic activity with time. Therefore, Rh is carried on a ceria material. When a ceria material is thermally aged through repeated uses at a high temperature, however, its specific surface area is largely reduced through sintering as compared with that of $Al_2O_3$, and therefore, it is necessary to increase the amount of Rh to be carried in order to attain high purifying performance.

SUMMARY OF THE INVENTION

An object of the invention is providing an exhaust gas purifying catalyst that exhibits purifying performance equivalent to that of a conventional catalyst with a smaller amount of carried Rh than in the conventional catalyst.

In order to achieve the object, the exhaust gas purifying catalyst of the present invention includes a carrier; and a catalyst layer provided on the carrier, and the catalyst layer includes active $Al_2O_3$ on which a noble metal is carried, an oxygen storage agent on which Rh is carried, $Al_2O_3$ coated with $ZrO_2$ on which Rh is carried, and a binder material.

According to the present invention, even when the catalyst is thermally aged through repeated uses at a high temperature, the specific surface area of the $Al_2O_3$ is not reduced as compared with that of a ceria material. Also, since the $Al_2O_3$ is coated with the $ZrO_2$ and the $ZrO_2$ is present between the Rh and the $Al_2O_3$, contact between the Rh and the $Al_2O_3$ is restricted, and therefore, even when it is thermally aged through repeated uses at a high temperature, solid solution of the Rh into the $Al_2O_3$ is suppressed. Therefore, in the case where the same amount of Rh is carried, the present catalyst can keep high purifying performance for a long period of time as compared with a conventional catalyst in which Rh is carried on a ceria material. Accordingly, for attaining purifying performance equivalent to that of the conventional catalyst, the amount of Rh to be carried can be reduced in the present catalyst, resulting in lowering the cost.

Furthermore, since the Rh is carried on the $ZrO_2$ that coats the $Al_2O_3$, in the case where a moisture component ($H_2O$) coexists in the exhaust gas, generation of hydrogen ($H_2$) through a reaction between $H_2O$ and HC included in the exhaust gas is accelerated through so-called a steam reforming reaction. Owing to this hydrogen ($H_2$), the catalyst noble metals of Rh, Pd and Pt are reduced from oxides so as to improve the function of the three way catalyst, resulting in achieving high purifying performance even at a low catalyst temperature. In addition, the generated hydrogen ($H_2$) has not only a function to reduce the catalyst noble metal oxides but also a function to directly purify the exhaust gas through reduction of NOx.

Moreover, since both the oxygen storage agent carrying the Rh and the $ZrO_2$-coated $Al_2O_3$ are included, as compared with a catalyst in which Rh is directly carried on $Al_2O_3$, high NOx purifying performance can be attained in a stationary period when an air fuel ratio A/F is stationary (namely, in a stoichiometric period) and a transient period when the air fuel ratio A/F is changed, and in an acceleration period (namely, a rich period) in particular.

In order to appropriately exhibit the aforementioned functions, a mass ratio of $ZrO_2/Al_2O_3$ in the $Al_2O_3$ coated with $ZrO_2$ is preferably 5/95 through 15/85 and more preferably 1/9. This is because when the ratio of $ZrO_2/Al_2O_3$ is smaller than 5/95, solid solution of the Rh into the $Al_2O_3$ is proceeded, namely, the amount of $ZrO_2$ is so small that the amount of Rh carried on the $Al_2O_3$ is large and hence the solid solution of the Rh into the $Al_2O_3$ is easily caused. On the other hand, when the ratio of $ZrO_2/Al_2O_3$ is larger than 15/85, the proportion of the $Al_2O_3$ is so small that the specific surface area is unpreferably reduced as a whole.

In the exhaust gas purifying catalyst of the invention, the oxygen storage agent may be a $CeO_2$—$ZrO_2$—$Nd_2O_3$ composite oxide. In this case, since the oxygen storage/discharge speed through Rh of the $CeO_2$—$ZrO_2$—$Nd_2O_3$ composite oxide is higher by several times than that of $CeO_2$, oxygen can be stored/discharged in response to the change of the air fuel ratio A/F. Accordingly, even when the air fuel ratio A/F is changed, high purifying performance can be immediately attained.

In this case, in order to appropriately exhibit the aforementioned functions, a mass ratio of $CeO_2/ZrO_2/Nd_2O_3$ in the $CeO_2$—$ZrO_2$—$Nd_2O_3$ composite oxide used as the oxygen storage agent is preferably 20 through 25/65 through 70/5 through 15.

In the exhaust gas purifying catalyst of the invention, the binder material may be $ZrO_2$. In this case, the $ZrO_2$ tightly fixes particles of the active $Al_2O_3$ and the like on which the noble metals are carried, and hence, a state where the respective particles are spaced from one another can be kept, thereby suppressing lowering of the catalytic activity through progress of sintering. In particular, when the binder material is $ZrO_2$, it well fits the $ZrO_2$ present on the surface of the $ZrO_2$-coated $Al_2O_3$, and thus, particles of the $ZrO_2$-coated $Al_2O_3$ can be fixed together with the Rh at a high degree of fixation.

In the exhaust gas purifying catalyst of the invention, the catalyst layer may have a single layer structure or a two-layer structure as follows:

An alternative exhaust gas purifying catalyst of the invention includes a carrier, an inside catalyst layer provided on the carrier and an outside catalyst layer provided directly on the inside catalyst layer, and the inside catalyst layer includes active $Al_2O_3$ on which a noble metal is carried, an oxygen storage agent and a binder material, and the outside catalyst layer includes active $Al_2O_3$ on which a noble metal is carried, an oxygen storage agent on which Rh is carried, $Al_2O_3$ coated with $ZrO_2$ on which Rh is carried, and a binder material.

BRIEF DESCRIPTION OF THE DRAWINGS

Other and further objects, features and advantages of the invention will be apparent from the following description taken in connection with the accompanying drawings wherein:

FIG. 11 is a graph for showing the relationship between a mass percentage of $ZrO_2$ in $ZrO_2/Al_2O_3$ and a specific surface area.

DETAILED DESCRIPTION OF THE INVENTION

A preferred embodiment of the invention will now be described with reference to the accompanying drawings.

Figure 1:
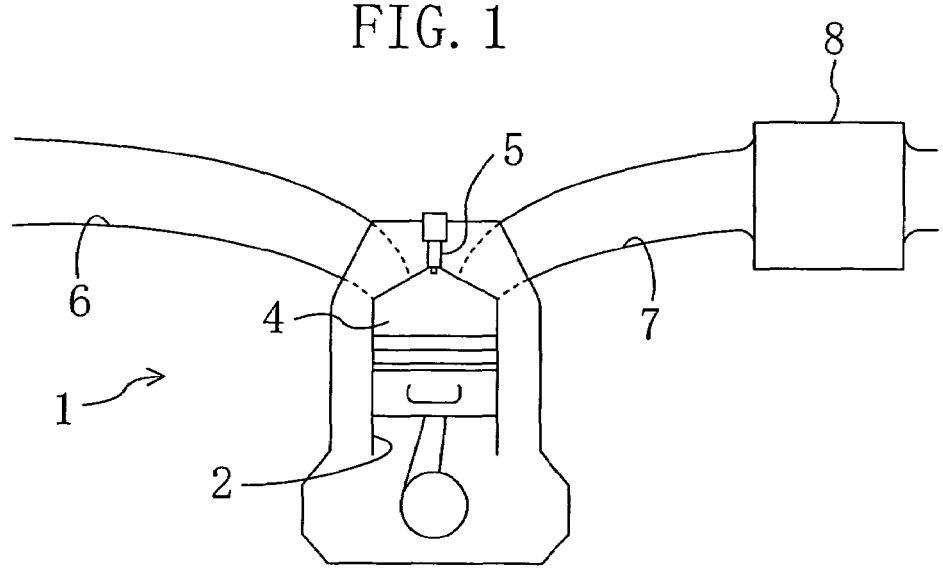
FIG. 1 is a diagram for showing the rough structure of an automobile engine.

FIG. 1 shows the structure of an automobile engine 1.

The engine 1 includes a combustion chamber 4 having a spark plug 5 at the uppermost portion thereof correspondingly to each cylinder 2, and the combustion chamber 4 is connected to a suction passage 6 and an exhaust passage 7. The exhaust passage 7 is provided with a three way catalyst 8 working as an exhaust gas purifying catalyst. Exhaust gas preferably has a moisture content included in inlet air, namely, the atmospheric air, but is not particularly specified.

<Structure of Three Way Catalyst>

Figure 2:
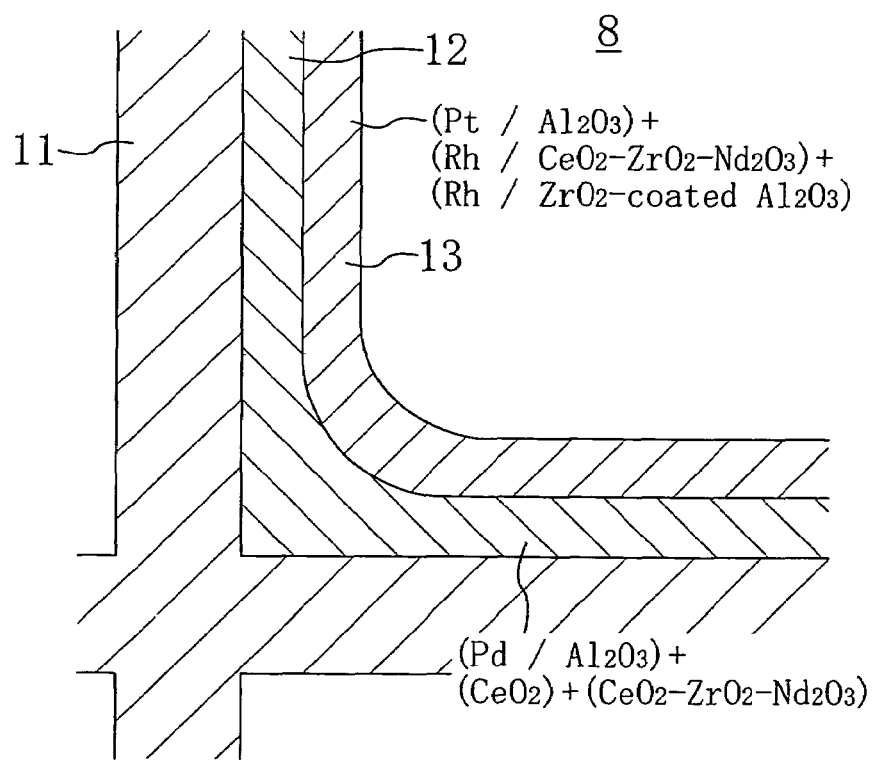
FIG. 2 is a diagram for showing the structure of a three way catalyst according to an embodiment of the invention.

FIG. 2 shows the structure of the three way catalyst 8 according to the embodiment of the invention.

The three way catalyst 8 includes a carrier 11, an inside catalyst layer 12 provided directly on the carrier 11 and an outside catalyst layer 13 provided directly on the inside catalyst layer 12.

The carrier 11 is, for example, a honeycomb carrier of cordierite.

The inside catalyst layer 12 includes a Pd/active $Al_2O_3$ component in which a noble metal of Pd is carried on active $Al_2O_3$; $CeO_2$ (ceria) and a $CeO_2$—$ZrO_2$—$Nd_2O_3$ composite oxide working as an oxygen storage agent; and $ZrO_2$ working as a binder material. In the $CeO_2$—$ZrO_2$—$Nd_2O_3$ composite oxide, the mass ratio of $CeO_2/ZrO_2/Nd_2O_3$ is 20 through 25/65 through 70/5 through 15 and preferably 23/67/10.

The outside catalyst layer 13 includes a Pt/active $Al_2O_3$ component in which a noble metal of Pt is carried on active $Al_2O_3$; a Rh/$CeO_2$—$ZrO_2$—$Nd_2O_3$ composite oxide component in which Rh is carried on a $CeO_2$—$ZrO_2$—$Nd_2O_3$ composite oxide; a Rh/$ZrO_2$-coated $Al_2O_3$ component in which Rh is carried on $ZrO_2$ that coats $Al_2O_3$; and $ZrO_2$ working as a binder material. In the Rh/$CeO_2$—$ZrO_2$—$Nd_2O_3$ composite oxide component, the mass ratio of $CeO_2/ZrO_2/Nd_2O_3$ is 20 through 25/65 through 70/5 through 15 and preferably 23/67/10. Also, in the Rh/$ZrO_2$-coated $Al_2O_3$ component, the mass ratio of $ZrO_2/Al_2O_3$ is 5/95 through 15/85.

Figure 3:
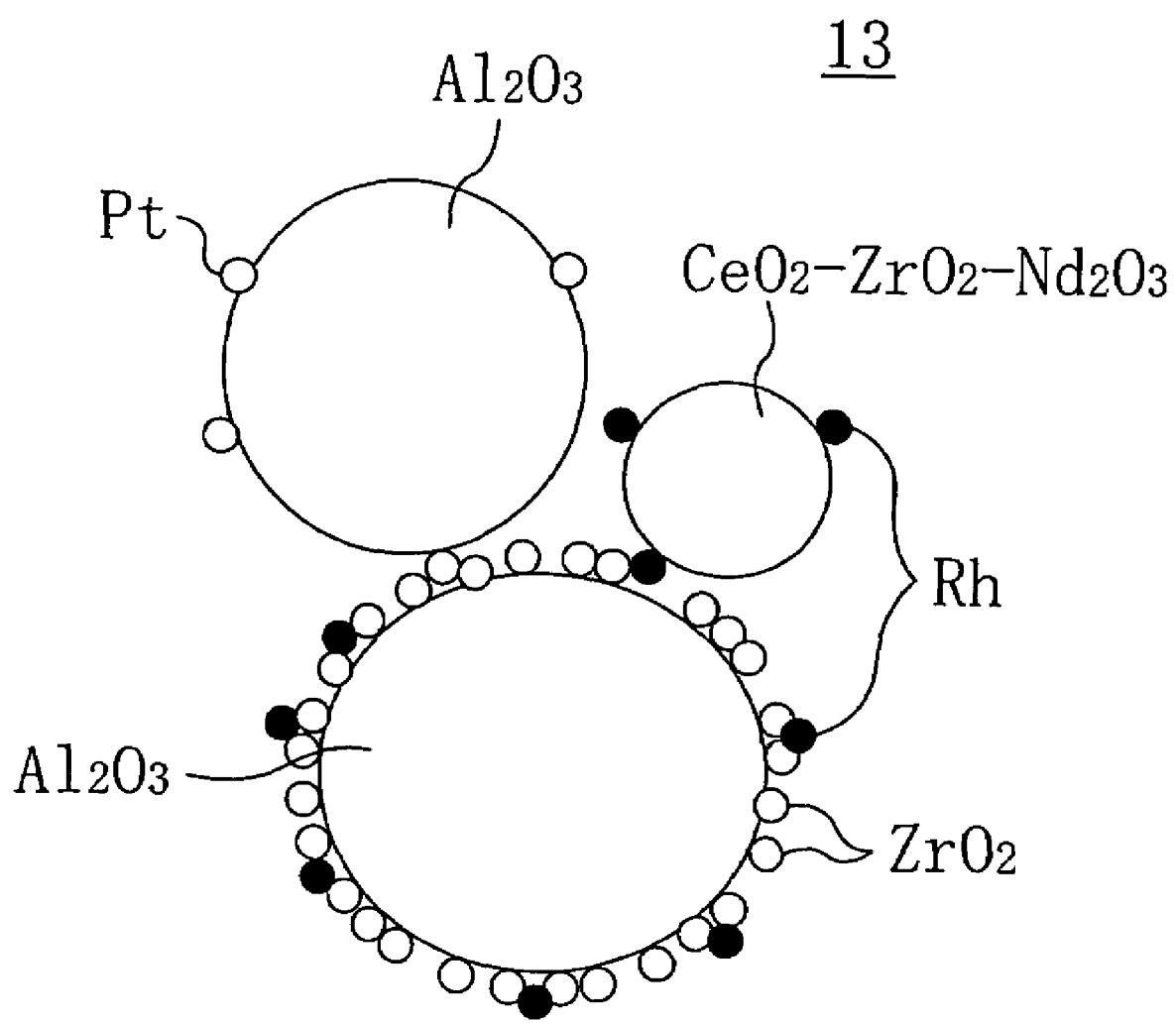
FIG. 3 is a diagram for showing an outside catalyst layer.

FIG. 3 schematically shows the structure of the outside catalyst layer 13.

In the outside catalyst layer 13, particles of the Pt/active $Al_2O_3$ component, particles of the Rh/$CeO_2$—$ZrO_2$—$Nd_2O_3$ composite oxide component and particles of the Rh/$ZrO_2$-coated $Al_2O_3$ component are dispersed, and $ZrO_2$ (not shown) is present among these particles. In a particle of the Pt/active $Al_2O_3$ component, Pt is carried on an active $Al_2O_3$ particle. In a particle of the Rh/$CeO_2$—$ZrO_2$—$Nd_2O_3$ composite oxide component, Rh is carried on a particle of the $CeO_2$—$ZrO_2$—$Nd_2O_3$ composite oxide component. In a particle of the Rh/$ZrO_2$-coated $Al_2O_3$ component, a large number of $ZrO_2$ particles are adhered on and cover the surface of an $Al_2O_3$ particle, and Rh is carried on the $ZrO_2$ particles. Accordingly, Rh is not carried on an $Al_2O_3$ particle but is in contact with the $ZrO_2$ carried on the $Al_2O_3$, and in the whole catalyst layer, particles of the Rh/$CeO_2$—$ZrO_2$—$Nd_2O_3$ composite oxide component and particles of the Rh/$ZrO_2$-coated $Al_2O_3$ component are in a mixed state. This is apparent from a fabrication method for the three way catalyst 8 described below. In this embodiment, the Rh/$ZrO_2$-coated $Al_2O_3$ is included in the outside catalyst layer 13 because a steam reforming reaction easily occurs in the outside catalyst layer 13 and if Pd is included in the outside catalyst layer 13, the exhaust gas purifying performance may be lowered through sulfur poisoning of Pd.

Furthermore, Ba having functions to suppress sintering of Rh and to suppress poisoning with P is carried on both the inside catalyst layer 12 and the outside catalyst layer 13.

In this three way catalyst 8, Pd, Pt and Rh are carried as the noble metals, and the mass ratio of Pd/Pt/Rh is preferably 1/5/2.

The active $Al_2O_3$ included in the inside catalyst layer 12 and the outside catalyst layer 13 includes a small amount (5%) of La for suppressing thermal degradation of the active $Al_2O_3$.

Next, the purifying mechanism for exhaust gas attained by using this exhaust gas purifying catalyst will be described.

First, when the engine 1 is started, HC included in the exhaust gas is burnt by using the Pd included in the inside catalyst layer 12 with high low-temperature catalytic activity, and thus, the catalyst temperature is increased so that the Pt and the Rh included in the outside catalyst layer 13 can attain the catalytic activity.

Then, in a stationary period (in which a theoretical air fuel ratio A/F is 14.7; namely, a stoichiometric period), HC and CO included in the exhaust gas are oxidation purified and NOx is reduction purified by using the Pd as well as the Pt and the Rh having attained the catalytic activity. The Pd has particularly high oxidation activity for unsaturated HC, the Pt has particularly high oxidation activity for unsaturated HC, and the Rh has particularly high reduction activity for NOx.

When the air fuel ratio A/F is deflected to a lean side or a rich side, oxygen is stored or discharged by the $CeO_2$ and the $CeO_2$—$ZrO_2$—$Nd_2O_3$ composite oxide working as the oxygen storage agent of the inside catalyst layer 12 and by the Rh/$CeO_2$—$ZrO_2$—$Nd_2O_3$ composite oxide component of the outside catalyst layer 13, so as to attain balance for appropriately performing the oxidation/reduction purification of the exhaust gas. The $CeO_2$—$ZrO_2$—$Nd_2O_3$ composite oxide carrying the Rh has a very high speed for storing/discharging oxygen through the Rh, and hence can store or discharge oxygen in response to change of the air fuel ratio A/F.

Also, the Ba carried on the inside catalyst layer 12 and the outside catalyst layer 13 suppresses the sintering of the Rh as well as the poisoning with P.

In the three way catalyst 8 described above according to this embodiment of the invention, even when it is thermally aged through repeated uses at a high temperature, the specific surface area of the $Al_2O_3$ is not reduced as compared with that of a ceria material. Furthermore, since the $Al_2O_3$ is coated with the $ZrO_2$ and the $ZrO_2$ is present between the Rh and the $Al_2O_3$ in the outside catalyst layer 13, contact between the Rh and the $Al_2O_3$ is restricted, and therefore, even when the catalyst is thermally aged through repeated uses at a high temperature, solid solution of the Rh into the $Al_2O_3$ is suppressed. Accordingly, if the same amount of Rh is carried, the present catalyst can keep high purifying performance for a longer period of time than a conventional catalyst in which Rh is carried on a ceria material. Therefore, in order to achieve purifying performance equivalent to that of the conventional catalyst, the amount of Rh to be carried can be smaller in the present catalyst than in the conventional catalyst. As a result, the cost can be reduced.

Furthermore, since the Rh is carried on the $ZrO_2$ that coats the $Al_2O_3$ in the outside catalyst layer 13, in the case where a moisture component ($H_2O$) coexists in the exhaust gas, generation of hydrogen ($H_2$) through a reaction between $H_2O$ and HC included in the exhaust gas is accelerated through the steam reforming reaction. Owing to this hydrogen ($H_2$), the catalyst noble metals of Rh, Pd and Pt are reduced from oxides, so as to improve the function of the three way catalyst. As a result, high purifying performance can be attained even at a low catalyst temperature. In addition, the generated hydrogen ($H_2$) has not only a function to reduce the catalyst noble metal oxides but also a function to directly purify the exhaust gas through reduction of NOx.

Moreover, since both the Rh/$CeO_2$—$ZrO_2$—$Nd_2O_3$ composite oxide component and the Rh/$ZrO_2$-coated $Al_2O_3$ component are included in the outside catalyst layer 13, as compared with a catalyst in which Rh is directly carried on $Al_2O_3$, high NOx purifying performance can be attained in a stationary period when the air fuel ratio A/F is stationary and in a transient time when the air fuel ratio A/F is changed, and particularly in an acceleration period, as is obvious from Evaluation Test 3 described below.

Additionally, since the oxygen storage/discharge through the Rh of the Rh/$CeO_2$—$ZrO_2$—$Nd_2O_3$ composite oxide component of the outside catalyst layer 13 is performed at a very high speed, oxygen can be stored/discharged in response to the change of the air fuel ratio A/F, so that high purifying performance can be immediately attained after the change of the air fuel ratio A/F.

Furthermore, the $ZrO_2$ used as the binder tightly fixes the respective particles of the Pd/active $Al_2O_3$ component and the like, and hence, a state where the respective particles are spaced from one another can be kept. As a result, lowering of the catalytic activity through progress of the sintering can be suppressed.

<Fabrication Method for Three Way Catalyst>

Next, the fabrication method for the three way catalyst 8 will be described.

—Formation of Inside Catalyst Layer—

A palladium nitrate aqueous solution is added dropwise to active $Al_2O_3$ powder including 5 mass % of La and the resultant is dried and baked at 450° C., so as to give Pd/active $Al_2O_3$ catalyst powder.

The Pd/active $Al_2O_3$ catalyst powder is mixed with $CeO_2$ and a $CeO_2$—$ZrO_2$—$Nd_2O_3$ composite oxide both working as an oxygen storage agent and $ZrO_2$ working as a binder. Water and nitric acid are added thereto, and the resultant is mixed and stirred with a disperser, so as to give slurry.

A carrier 11 is immersed in the slurry and then pulled up to remove excessive slurry with air blow. These procedures are repeated until the carrier 11 is coated with a desired amount of slurry.

Thereafter, the temperature of the carrier 11 is increased from room temperature to 450° C. at a constant rate of temperature increase over 1.5 hour, and is kept at 450° C. for 2 hours (for drying and baking), thereby forming an inside catalyst layer.

—Formation of Outside Catalyst Coat Layer—

A dinitrodiamine platinum nitrate aqueous solution is added dropwise to active $Al_2O_3$ powder including 5 mass % of La, and the resultant is dried and baked at 450° C., so as to give Pt/active $Al_2O_3$ catalyst powder.

Also, a rhodium nitrate aqueous solution is added dropwise to a $CeO_2$—$ZrO_2$—$Nd_2O_3$ composite oxide, and the resultant is dried and baked at 450° C., so as to give Rh/$CeO_2$—$ZrO_2$—$Nd_2O_3$ composite oxide catalyst powder.

Furthermore, a rhodium nitrate aqueous solution is added dropwise to $Al_2O_3$ carrying $ZrO_2$, and the resultant is dried and baked at 450° C., so as to give $Rh/ZrO_2$-coated $Al_2O_3$ catalyst powder.

Then, the $Pt$/active $Al_2O_3$ catalyst powder, the $Rh/CeO_2$—$ZrO_2$—$Nd_2O_3$ composite oxide powder and the $Rh/ZrO_2$-coated $Al_2O_3$ catalyst powder are mixed with $ZrO_2$ working as a binder, water and nitric acid are added thereto, and the resultant is mixed and stirred with a disperser so as to give slurry.

The carrier 11, on which the inside catalyst layer has been formed, is immersed in this slurry and then pulled up to remove excessive slurry with air blow. These procedures are repeated until the inside catalyst layer is coated with a desired amount of slurry.

Thereafter, the temperature of the carrier 11 is increased from room temperature to 450° C. at a constant rate of temperature increase over 1.5 hour, and is kept at 450° C. for 2 hours (for drying and baking), thereby forming an outside catalyst layer.

—Impregnation for Carrying Ba—

The inside catalyst layer and the outside catalyst layer formed in the aforementioned manner on the carrier 11 are impregnated with a barium acetate aqueous solution.

Thereafter, the temperature of the carrier 11 is increased from room temperature to 200° C. at a substantially constant rate of temperature increase over 1.5 hour, and is kept at 200° C. for 2 hours (for drying). Then, the temperature is increased from 200° C. to 500° C. at a substantially constant rate of temperature increase over 4 hours, and is kept at 500° C. for 2 hours (for baking).

Now, evaluation obtained through tests performed on the three way catalyst of the present invention will be described.

[Evaluation Test 1]

(Catalysts Evaluated by Test)

EXAMPLE 1

Five kinds of three way catalysts having the same structure as that described in the above embodiment but different in the amount of carried noble metals were prepared as Example 1.

For example, one of the three way catalysts with the amount of carried noble metals of 1.68 g/L has the following constitution. It is noted that the content is expressed as an amount per liter of the honeycomb carrier.

—Inside Catalyst Layer—

Content of Pd/active $Al_2O_3$ component: 62.479 g/L (Amount of carried Pd: 1.050 g/L)

Content of $CeO_2$ (ceria): 4.770 g/L

Content of $CeO_2$—$ZrO_2$—$Nd_2O_3$ composite oxide: 4.770 g/L

Content of $ZrO_2$: 7.120 g/L

—Outside Catalyst Layer—

Content of Pt/active $Al_2O_3$ component: 25.373 g/L (Amount of carried Pt: 0.210 g/L)

Content of $Rh/CeO_2$—$ZrO_2$—$Nd_2O_3$ composite oxide component: 55.825 g/L (Amount of carried Rh: 0.294 g/L)

Content of $Rh/ZrO_2$-coated $Al_2O_3$ component: 16.710 g/L (Amount of carried Rh: 0.126 g/L)

Content of $ZrO_2$: 10.950 g/L

—Ba—

Content of Ba: 11.00 g/L

Comparative Example 1

A three way catalyst having the same structure as that of Example 1 except that the $Rh/ZrO_2$-coated $Al_2O_3$ component was excluded was prepared as Comparative Example 1. The three way catalyst of Comparative Example 1 has the following constitution:

—Inside Catalyst Layer—

Content of Pd/active $Al_2O_3$ component: 59.438 g/L (Amount of carried Pd: 4.091 g/L)

Content of $CeO_2$ (ceria): 4.770 g/L

Content of $CeO_2$—$ZrO_2$—$Nd_2O_3$ composite oxide: 4.770 g/L

Content of $ZrO_2$: 7.120 g/L

—Outside Catalyst Layer—

Content of Pt/active $Al_2O_3$ component: 25.447 g/L (Amount of carried Pt: 0.136 g/L)

Content of $Rh/CeO_2$—$ZrO_2$—$Nd_2O_3$ composite oxide component: 55.846 g/L (Amount of carried Rh: 0.273 g/L)

Content of $ZrO_2$: 9.080 g/L

—Ba—

Content of Ba: 11.00 g/L (Evaluation Test Method)

Each of the three way catalysts of Example 1 and Comparative Example 1 was subjected to a rig test.

The rig test was carried out as follows: Each three way catalyst having been aged by using an engine was taken out from an exhaust pipe and cut into a cylindrical shape with a diameter of 2.54 cm and a length of 5 cm, and the resultant cylindrical catalyst was installed on a fixed-bed flow reactor used as an evaluation apparatus.

A burnt gas with an air fuel ratio A/F of 14.7±0.9 was simulated as simulated exhaust gas. Specifically, while allowing main stream gas with an air fuel ratio A/F of 14.7 to stationarily flow, a given amount of gas for change was added at 1 Hz in a pulse-like manner, so as to forcedly deflect the air fuel ratio A/F with an amplitude of ±0.9. The main stream gas had a composition of 13.9% of $CO_2$, 0.6% of $O_2$, 0.6% of CO, 0.2% of $H_2$, 0.056% of $C_3H_6$, 0.1% of NO, 10% of $H_2O$ and the remaining of $N_2$. Furthermore, the simulated exhaust gas was allowed to flow into the three way catalyst at a flow rate of 25 L/min. Also, $O_2$ was used as the gas for change when the air fuel ratio A/F was to be deflected to the lean side (namely, to attain the air fuel ratio A/F of 15.6) and $H_2$ and CO were used when it was to be deflected to the rich side (namely, to attain the air fuel ratio A/F of 13.9).

Under these conditions, temperatures T50 and rates C400 for purifying HC, CO and NOx were obtained with respect to each three way catalyst.

At this point, the temperature T50 corresponds to a catalyst inlet gas temperature (light off temperature) attained when the temperature of the simulated exhaust gas is gradually increased and the concentration of the component (namely, HC, CO or NOx) detected downstream of the three way catalyst becomes a half of the concentration of the component in the gas flowing into the three way catalyst (namely, when the purification rate becomes 50%).

Also, the rate C400 corresponds to a purification rate of the component attained when the temperature of the simulated exhaust gas at the inlet of the three way catalyst is 400° C.

(Results of Evaluation Test)

Figure 4A:
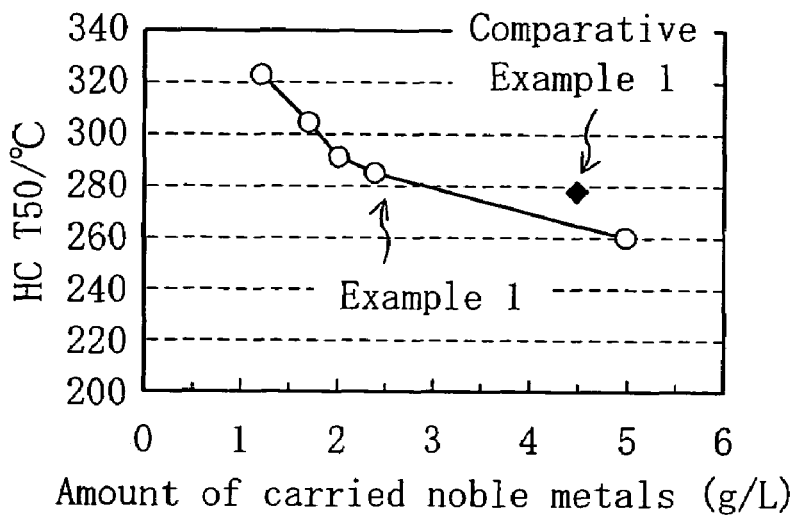
FIG. 4A is a graph for showing the relationship between the amount of carried noble metals and a temperature T50 for HC.
Figure 4B:
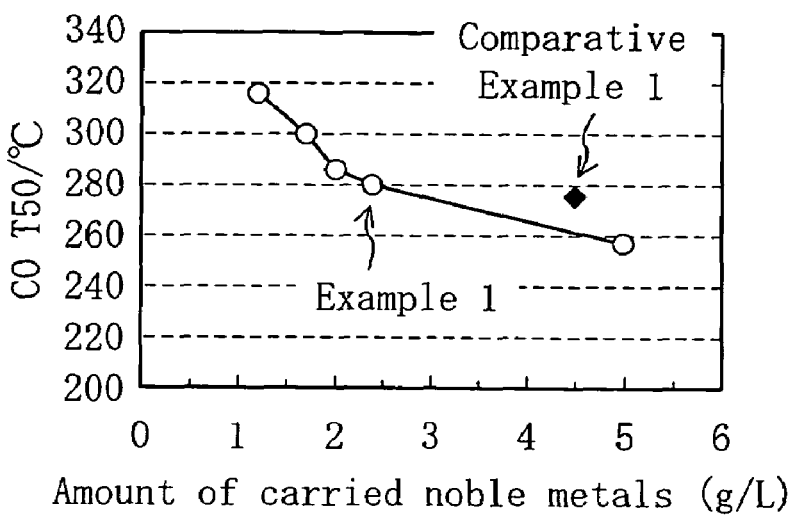
FIG. 4B is a graph for showing the relationship between the amount of carried noble metals and a temperature T50 for CO and FIG. 4C is a graph for showing the relationship between the amount of carried noble metals and a temperature T50 for NOx.
Figure 4C:
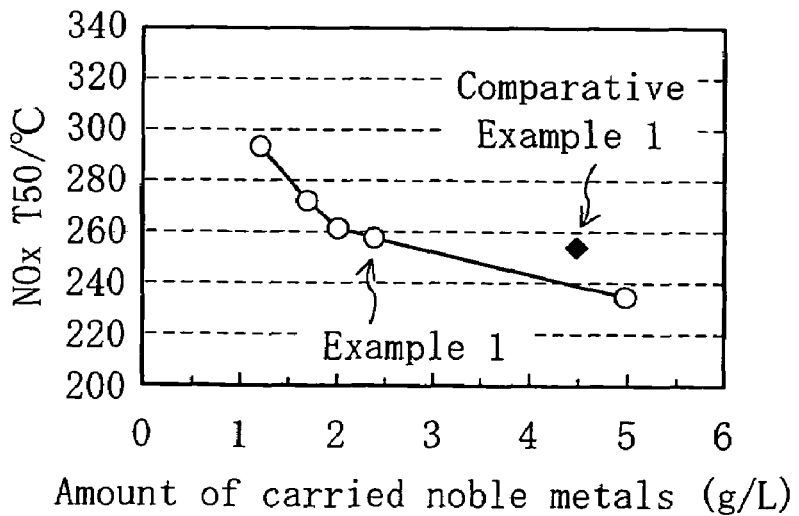

FIGS. 4A through 4C respectively show the relationships between the amount of the carried noble metals and the temperatures T50 for HC, CO and NOx in Example 1 and Comparative Example 1.

It is understood from FIGS. 4A through 4C that the temperatures T50 for HC, CO and NOx are all reduced as the amount of the carried noble metals is larger in the catalysts of Example 1. This seems to be because the noble metals need to have higher catalytic activity when the carried amount is small than when it is large and the catalytic activity of the noble metals is higher as the catalyst temperature is higher.

Furthermore, it is understood that the temperature T50 is more gently reduced when the amount of the carried noble metals exceeds 2.5 g/L than when it is in a range of 1.0 to 2.5 g/L. This seems to be because as the amount of the carried noble metals is larger, the amount becomes more sufficient for the amount of exhaust gas and hence the purifying performance attains a margin.

It is understood that in the catalyst of Comparative Example 1, which has the amount of the carried noble metals of 4.5 g/L, the temperatures T50 for HC, CO and NOx are all higher by approximately 20° C. than in an equivalent catalyst including a $Rh/ZrO_2$-coated $Al_2O_3$ component estimated based on the data of Example 1. This seems to be for the following reason: Even when a catalyst including a $Rh/ZrO_2$-coated $Al_2O_3$ component is thermally aged through repeated uses at a high temperature, the specific surface area of the $Al_2O_3$ is not reduced as compared with that of a ceria material. Moreover, since the $Al_2O_3$ is coated with the $ZrO_2$ and the $ZrO_2$ is present between the Rh and the $Al_2O_3$, the contact between the Rh and the $Al_2O_3$ is restricted. Therefore, even when it is thermally aged through repeated uses at a high temperature, the solid solution of the Rh into the $Al_2O_3$ is suppressed, and hence, the purifying performance can be kept for a long period of time. In contrast, in the catalyst of Comparative Example 1, when the $CeO_2$—$ZrO_2$—$Nd_2O_3$ composite oxide carrying the Rh is thermally aged through repeated uses at a high temperature, the specific surface area is largely reduced through the sintering, resulting in lowering the catalyst performance.

Furthermore, it is understood that the amount of the carried noble metals should be 2.0 through 2.5 g/L in order to attain the catalyst performance equivalent to that of Comparative Example 1 by a three way catalyst including a $Rh/ZrO_2$-coated $Al_2O_3$ component. When a three way catalyst according to Example 1 is assumed with the amount of the carried noble metals set to 2.5 g/L, for example, the amount of the carried Pd is 1.562 g/L, the amount of the carried Pt is 0.313 g/L and the amount of the carried Rh is 0.625 g/L. When this three way catalyst is compared with that of Comparative Example 1, although the amounts of the carried Pt and Rh are slightly larger, the amount of the carried Pd can be largely reduced, which is very effective for reducing the cost.

Figure 5A:
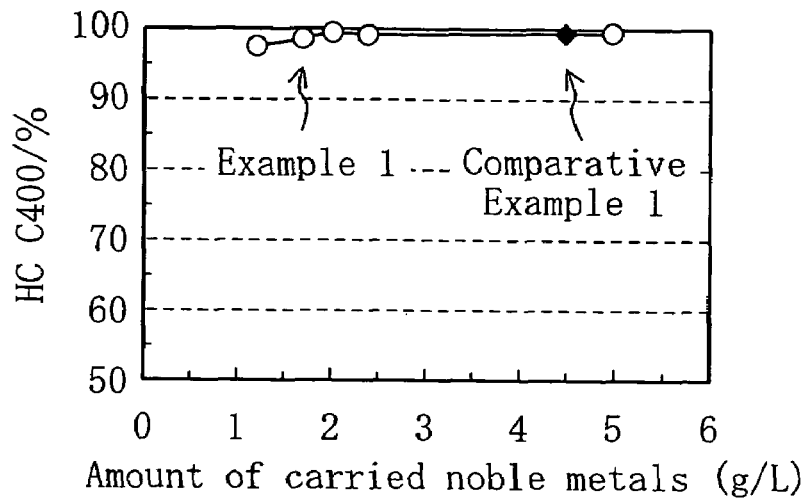
FIG. 5A is a graph for showing the relationship between the amount of carried noble metals and a rate C400 for HC.
Figure 5B:
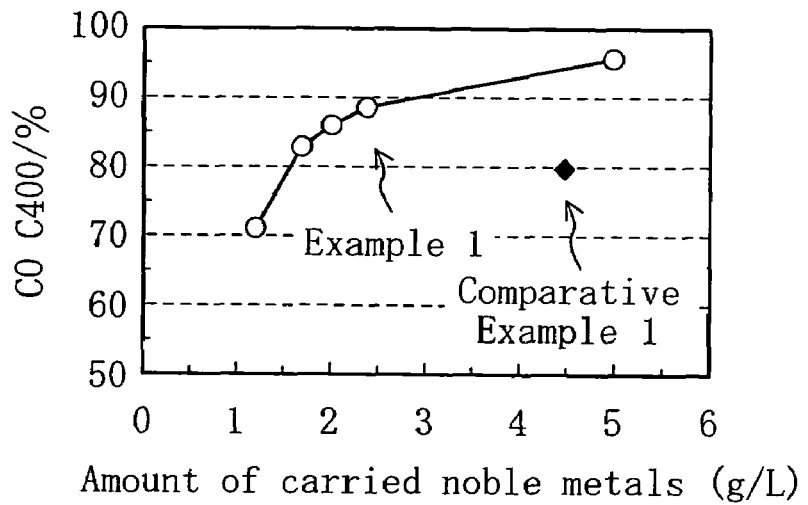
FIG. 5B is a graph for showing the relationship between the amount of carried noble metals and a rate C400 for CO and FIG. 5C is a graph for showing the relationship between the amount of carried noble metals and a rate C400 for NOx.
Figure 5C:
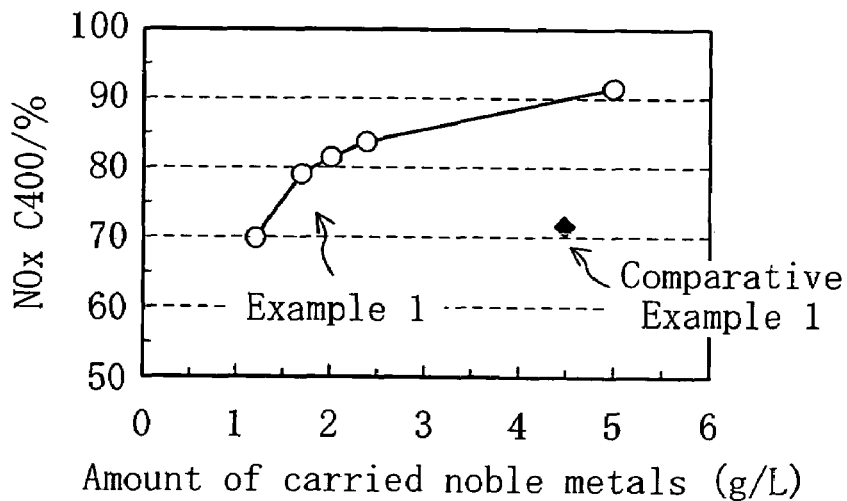

FIGS. 5A through 5C respectively show the relationships between the amount of the carried noble metals and the rates C400 for HC, CO and NOx in Example 1 and Comparative Example 1.

It is understood from FIGS. 5A through 5C that the rates C400 for HC, CO and NOx are all higher as the amount of the carried noble metals is larger in the catalysts of Example 1. This seems to be because the purifying performance for the exhaust gas is higher when the amount of the carried noble metals is large than when it is small.

Also, with respect to HC, it is understood that a very high purification rate can be attained regardless of the amount of the carried noble metals. This seems to be because HC has high reactivity.

Furthermore, with respect to CO and NOx, it is understood that the rate C40 is more gently increased when the amount of the carried noble metals exceeds 2.5 g/L than when it is in a range of 1.0 to 2.5 g/L. This seems to be because as the amount of the carried noble metals is larger, the amount becomes more sufficient for the amount of exhaust gas and hence the purifying performance attains a margin.

With respect to HC, it is understood that the three way catalyst of Comparative Example 1 attains a purification rate substantially equivalent to that of an equivalent catalyst including a $Rh/ZrO_2$-coated $Al_2O_3$ component estimated based on the data of Example 1. This also seems to be because HC has high reactivity.

Furthermore, with respect to CO and NOx, it is understood that the rates C400 of Comparative Example 1 are lower by 15 through 20% than an equivalent catalyst including a $Rh/ZrO_2$-coated $Al_2O_3$ component estimated based on the data of Example 1. This also seems to be for the following reason similarly to the temperature T50 described above: Even when a catalyst including a $Rh/ZrO_2$-coated $Al_2O_3$ component is thermally aged through repeated uses at a high temperature, the specific surface area of the $Al_2O_3$ is not reduced as compared with that of a ceria material. Moreover, the solid solution of the Rh in the $Al_2O_3$ is suppressed by the $ZrO_2$, and hence, the purifying performance can be kept for a long period of time. In contrast, in the catalyst of Comparative Example 1, when the $CeO_2$—$ZrO_2$—$Nd_2O_3$ composite oxide carrying the Rh is thermally aged through repeated uses at a high temperature, the specific surface area is largely reduced through the sintering, resulting in lowering the catalyst performance.

Furthermore, it is understood that the amount of the carried noble metals should be 1.5 through 2.0 g/L in order to attain the catalyst performance equivalent to that of Comparative Example 1 by a three way catalyst including a $Rh/ZrO_2$-coated $Al_2O_3$ component.

On the basis of the aforementioned results, it can be concluded that the lowering of the catalyst performance can be suppressed by carrying Rh on $Al_2O_3$ coated with $ZrO_2$. Accordingly, in order to attain equivalent performance to that of a conventional three way catalyst, the amount of expensive noble metals to be carried can be reduced, resulting in reducing the cost for the three way catalyst.

[Evaluation Test 2]
(Catalysts Evaluated by Test)

EXAMPLE 2

A three way catalyst having the same structure as that of Example 1 was prepared as Example 2.

Comparative Example 2

A three way catalyst having the same structure as that of Example 2 was prepared as Comparative Example 2 except that a $Rh/CeO_2$ component was included instead of the $Rh/CeO_2$—$ZrO_2$—$Nd_2O_3$ composite oxide component.

(Evaluation Test Method)

Figure 6:
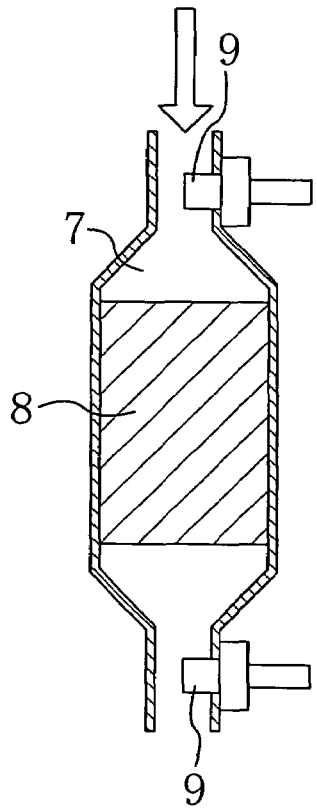
FIG. 6 is a diagram for showing the structure of a principal portion of a test apparatus used for measuring an oxygen storage speed.

FIG. 6 shows a principal part of a test apparatus used for measuring an oxygen storage speed.

This test apparatus simulates an exhaust passage 7 provided with a three way catalyst 8. Simulated gas can be allowed to pass therethrough, and linear oxygen sensors 9 are respectively provided on an inlet side and an outlet side of the three way catalyst 8.

Figure 7:
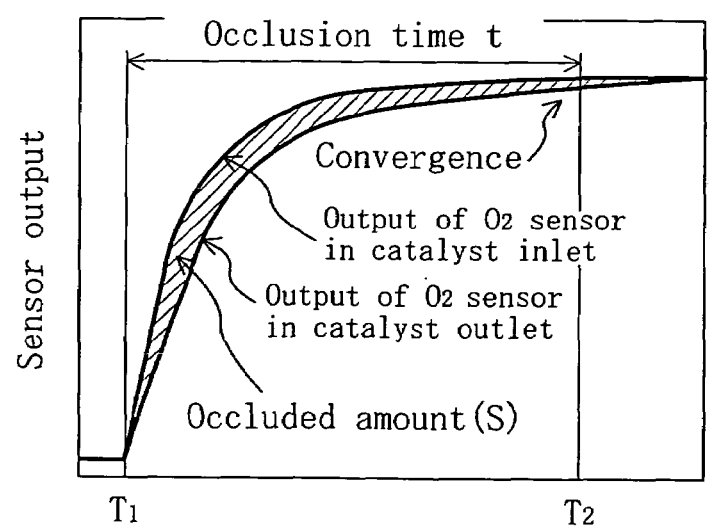
FIG. 7 is an explanatory diagram for explaining a calculation method for the oxygen storage speed.

Each of the three way catalysts of Example 2 and Comparative Example 2 was thermally aged at 1100° C. for 24 hours, and the resultant catalyst was provided in the exhaust passage 7 of the test apparatus for the following evaluation test:

After increasing the temperature of the three way catalyst 8 to a given temperature, simulated gas was allowed to pass therethrough through the following cycle: Oxygen was first allowed to pass for making the $CeO_2$—$ZrO_2$—$Nd_2O_3$ composite oxide or $CeO_2$ store oxygen, and then, nitrogen gas was allowed to pass for gas exchange. Thereafter, CO was allowed to pass so as to make the $CeO_2$—$ZrO_2$—$Nd_2O_3$ composite oxide or $CeO_2$ discharge oxygen for oxidizing the CO, and then, nitrogen gas was allowed to pass for gas exchange. Under these conditions, as shown in FIG. 7, an oxygen storage amount (S) was obtained as an integral value of an output difference between the linear oxygen sensors 9 provided on the inlet side and the outlet side of the three way catalyst 8, and an oxygen storage speed (V) was obtained by dividing the oxygen storage amount by time (storage time t) elapsed from the start of the supply of oxygen to time when there was no output difference between the linear oxygen sensors 9. The output of each linear oxygen sensor 9 was converted into an oxygen concentration, which was converted into a mole value on the basis of a gas flow rate employed at the corresponding time.

(Results of Evaluation Test)

Figure 8:
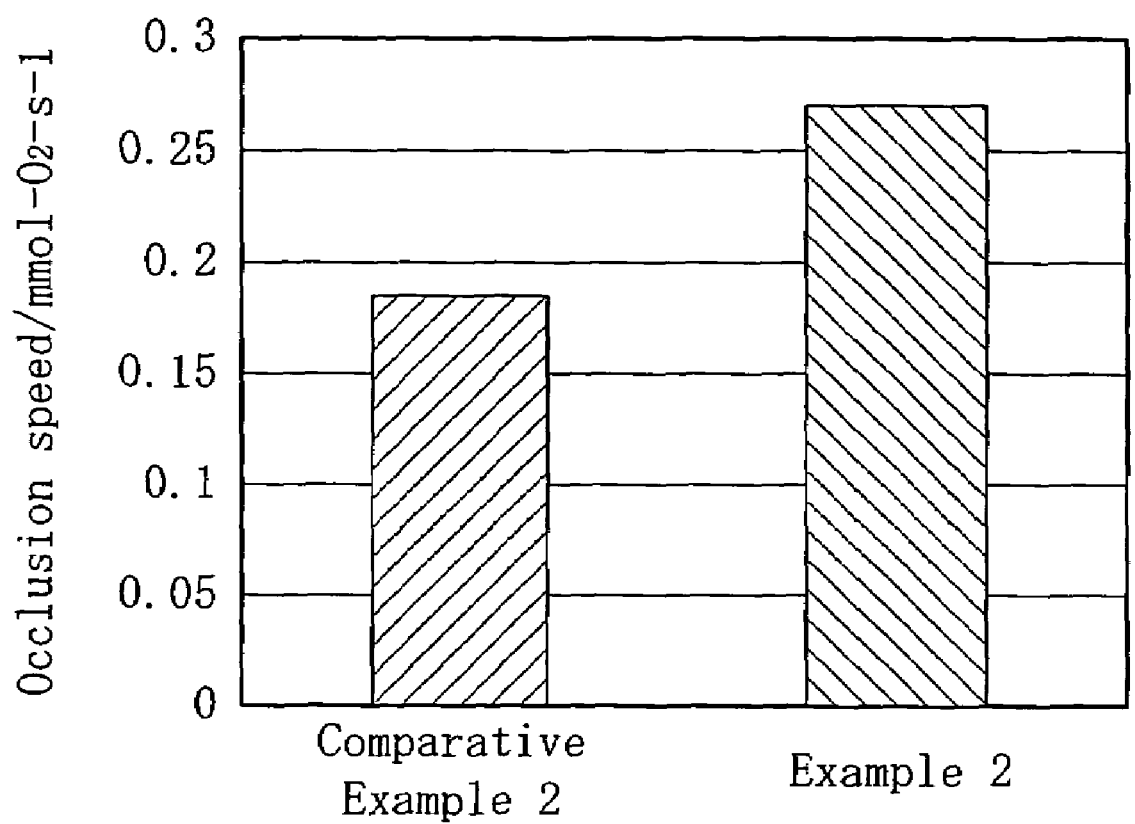
FIG. 8 is a graph for showing the oxygen storage speeds of Example 2 and Comparative Example 2.

FIG. 8 shows the oxygen storage speeds of the catalysts of Example 2 and Comparative Example 2.

It is understood from FIG. 8 that the oxygen storage speed is higher in Example 2 than in Comparative Example 2. This means that the oxygen storage/discharge performed through Rh by the $CeO_2$—$ZrO_2$—$Nd_2O_3$ composite oxide used as the oxygen storage agent in Example 2 has higher activity than the oxygen storage/discharge performed through Rh by the $CeO_2$. Accordingly, in the three way catalyst including the Rh/$CeO_2$—$ZrO_2$—$Nd_2O_3$ composite oxide as a catalyst component, even when the composition of the exhaust gas is varied in accordance with the change of the air fuel ratio A/F, oxygen can be supplied in response to the variation, resulting in attaining high purifying performance.

[Evaluation Test 3]

(Catalysts Evaluated by Test)

EXAMPLE 3

A catalyst in which Rh/$ZrO_3$-coated $Al_2O_3$ was carried on a carrier was prepared as Example 3.

EXAMPLE 4

A catalyst in which a Rh/$CeO_2$—$ZrO_2$—$Nd_2O_3$ composite oxide was carried on a carrier was prepared as Example 4.

Comparative Example 3

A catalyst in which Rh/$Al_2O_3$ was carried on a carrier was prepared as Comparative Example 3.

(Evaluation Test Method)

Each of the catalysts of Examples 3 and 4 and Comparative Example 3 was installed in the exhaust passage of the test apparatus used in Evaluation Test 2. Then, as shown in FIG. 9, exhaust gas obtained by assuming cyclic driving in which a stoichiometric period (with an air fuel ratio A/F of 14.7), a lean period (with an air fuel ratio A/F of 17.0) and a rich period (with an air fuel ratio A/F of 14.3) were cyclically repeated in this order was allowed to pass through the exhaust passage, so as to measure NOx purification rates in the stoichiometric period and the rich period.

(Results of Evaluation Test)

Figure 9:
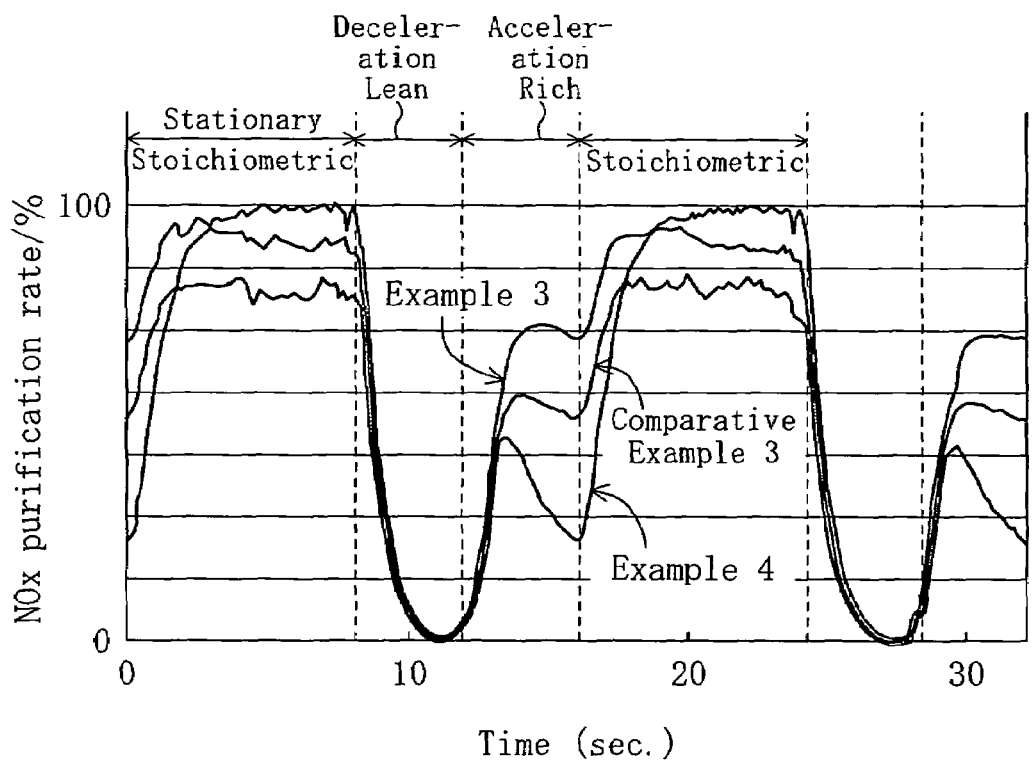
FIG. 9 is an explanatory diagram for explaining an evaluation test method of Evaluation Test 3.

It is understood from FIG. 9 that the NOx purification rates attained in the stoichiometric period are higher in the order of Example 4, Example 3 and Comparative Example 3 and those attained in the rich period are higher in the order of Example 3, Comparative Example 3 and Example 4.

This seems to be for the following reason: In the stoichiometric period, the change of the air fuel ratio A/F is cancelled owing to the high oxygen storage/discharge ability of the $CeO_2$—$ZrO_2$—$Nd_2O_3$ composite oxide and the Rh can effectively exhibit its NOx purifying performance in the catalyst of Example 4. In contrast, in the catalyst of Example 3 or Comparative Example 3, the $ZrO_2$-coated $Al_2O_3$ or $Al_2O_3$ does not have the oxygen storage/discharge ability, and hence, the NOx purifying performance is lower than in the catalyst of Example 4. On the other hand, with respect to the rich period, oxygen is discharged through the surface of the Rh owing to the oxygen discharge ability of the $CeO_2$—$ZrO_2$—$Nd_2O_3$ composite oxide and there exists excessive oxygen on the surface of the Rh, and therefore, NOx cannot be adsorbed and purified in the catalyst of Example 4. In contrast, in the catalyst of Example 3 or Comparative Example 3, since the $ZrO_2$-coated $Al_2O_3$ or the $Al_2O_3$ does not have oxygen storage/discharge ability and hence does not have a difficulty like the catalyst of Example 4, the NOx purifying performance is not harmfully affected.

Accordingly, in the present invention including the elements of both Examples 3 and 4, high NOx purifying performance can be attained owing to the Rh/$CeO_2$—$ZrO_2$—$Nd_2O_3$ composite oxide in the stoichiometric period and the lowering of the NOx purifying performance of the Rh/$CeO_2$—$ZrO_2$—$Nd_2O_3$ composite oxide is covered by the Rh/$ZrO_2$-coated $Al_2O_3$ in the rich period. Thus, high NOx purifying performance can be attained under wide driving conditions.

[Evaluation Test 4]

(Catalysts Evaluated by Test)

The catalysts of Example 3 and Comparative Example 3 used in Evaluation Test 3 were used for this evaluation test.

(Evaluation Test Method)

Each of the catalysts of Example 3 and Comparative Example 3 was subjected to XPS (X-ray photoelectron spectroscopy) after thermal aging at 1100° C. for 24 hours.

(Results of Evaluation Test)

Figure 10:
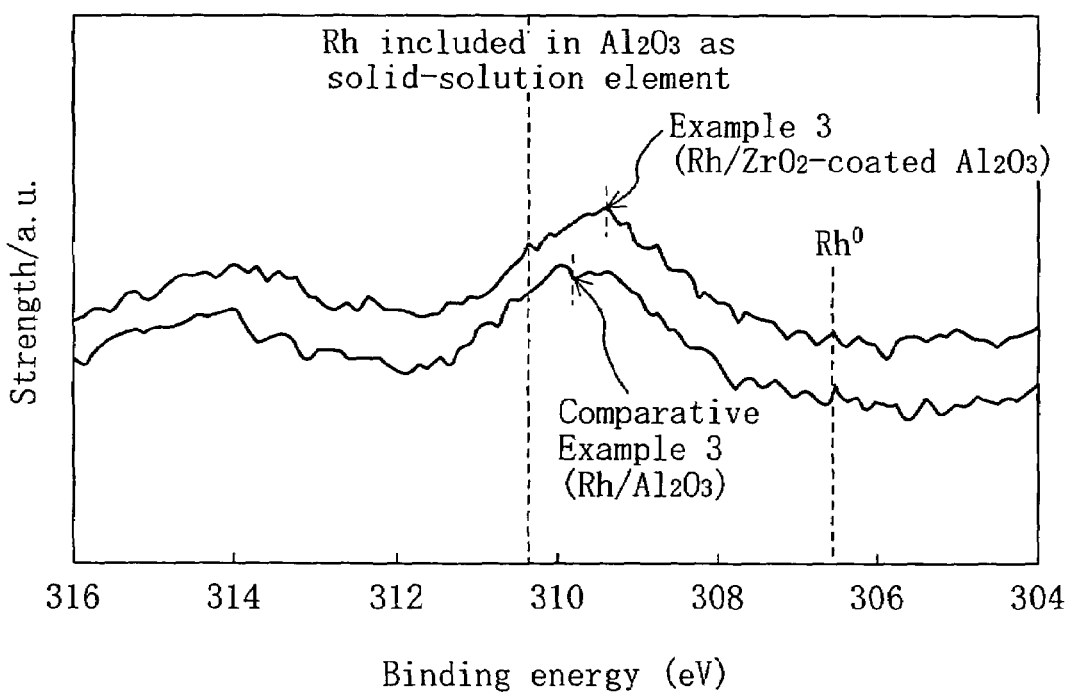
FIG. 10 is a graph for showing the relationship between binding energy and strength obtained in Example 3 and Comparative Example 3.

FIG. 10 shows the relationship between binding energy and strength. In this graph, $Rh^0$ indicates a peak of the Rh, and Rh included as a solid-solution element in $Al_2O_3$ has a peak shifted to a position corresponding to 310.3 eV.

It is understood from FIG. 10 that the peak of the catalyst of Example 3 is positioned in a lower energy side, namely, closer to the peak $Rh^0$, than that of the catalyst of Comparative Example 3. This seems to be because solid solution of the Rh into the $Al_2O_3$ is suppressed in the catalyst of Example 3 due to the $ZrO_2$ present between the $Al_2O_3$ and the Rh.

Evaluation Test 5

(Catalysts Evaluated by Test)

Five kinds of catalysts having the same structure as that of Example 3 with a ratio between $ZrO_2$ and $Al_2O_3$ changed in five levels and the catalyst of Comparative Example 3 were used for this evaluation test.

(Evaluation Test Method)

The specific surface area of each of the catalysts was measured after thermal aging at 1100° C. for 5 hours.

(Results of Evaluation Test)

FIG. 11 shows the relationship between the mass percentage of $ZrO_2$ in $ZrO_2/Al_2O_3$ and the specific surface area.

It is understood from FIG. 11 that the specific surface area is smaller as the content of $ZrO_2$ is larger. When the content of $ZrO_2$ is close to 20 mass %, the specific surface area is unpreferably lowered by approximately 20 $m^2/g$. Accordingly, the mass percentage of $ZrO_2$ in the $ZrO_2/Al_2O_3$ is preferably 15 mass % at most.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. An exhaust gas purifying catalyst comprising:
   a carrier;
   an inside catalyst layer provided on said carrier; and
   an outside catalyst layer provided directly on said inside catalyst layer,
   wherein said inside catalyst layer includes active $Al_2O_3$ on which a noble metal is carried, an oxygen storage agent and a binder material, and
   said outside catalyst layer includes active $Al_2O_3$ on which a noble metal is carried, an oxygen storage agent on which Rh is carried, $Al_2O_3$ coated with $ZrO_2$ on which Rh is carried, and a binder material.

2. The exhaust gas purifying catalyst of claim 1, wherein said oxygen storage agent is a $CeO_2$—$ZrO_2$—$Nd_2O_3$ composite oxide.

3. The exhaust gas purifying catalyst of claim 2, a wherein said $CeO_2$—$ZrO_2$—$Nd_2O_3$ composite oxide used as said oxygen storage agent, a mass ratio of $CeO_2$ is from 20 to 25 percent; a mass ratio of $ZrO_2$ is from 65 to 70 percent;
   and a mass ratio of $Nd_2O_3$ is from 5 to 15 percent.

4. The exhaust gas purifying catalyst of claim 1, wherein a mass ratio of $ZrO_2/Al_2O_3$ in said $Al_2O_3$ coated with $ZrO_2$ is from 5/95 to 15/85.

5. The exhaust gas purifying catalyst of claim 1, wherein said binder material is $ZrO_2$.

* * * * *